UNITED STATES PATENT OFFICE.

RUDOLF ADLER, OF AMSTERDAM, NETHERLANDS, ASSIGNOR TO NAAMLOOZE VENNOOTSCHAP ALGEMEENE UITVINDING EXPLOITATIE MAATSCHAPPIJ, OF AMSTERDAM, NETHERLANDS.

SOLUBLE PROTEIN COMPOUND OBTAINED FROM FISH AND PROCESS OF MAKING THE SAME.

1,101,513.     Specification of Letters Patent.     Patented June 23, 1914.

No Drawing.     Application filed October 2, 1913. Serial No. 792,962.

*To all whom it may concern:*

Be it known that I, RUDOLF ADLER, a chemist and a doctor of philosophy, a subject of the Emperor of Austria-Hungary, and a resident of 46 Amsteldijk, in the city of Amsterdam, Netherlands, have invented a new and useful Soluble Protein Compound Obtained from Fish and Processes of Making the Same, of which the following is a specification.

The manufacture of soluble protein compounds from meat or animal flesh is generally done in such way that meat is treated with water in the presence or absence of alkalis or acids, and subjected to an elevated temperature. This process which is generally in use has the great disadvantage, that on the one hand owing to the application of an elevated temperature a far-reaching splitting up of the protein into peptone like, low broken up substances takes place, and that, on the other hand when heating the protein in an alkaline solution a formation of melanins or melanoidins occurs. The presence of peptone-like substances in the protein preparation has as a consequence, that the product has a relatively low nutritive value, whereas, the presence of melanins and melanoidins on the one hand gives to the preparation a more or less dark color, and on the other hand owing to the poisonous properties of these substances, makes its use as human aliment questionable.

The present invention has for its object to obviate these drawbacks. It has been found that fish flesh can be transformed smoothly into soluble colorless, inodorous protein substances consisting for the larger part of proteoses, if the fish flesh previously well boiled out and afterward well-washed with hot water is stirred in a disintegrated state with a thick lime sludge and if the mixture thus obtained is allowed to remain for some time while moderately stirring the same. Now if after the hydrolysis is as complete as possible, the sludge is copiously diluted with water and thereafter in order to precipitate the calcium hydrate, carbonic acid is passed into the mass, after filtering a completely colorless solution of the protein compounds is obtained, which is then evaporated in the usual manner in a vacuum. In order to completely separate the calcium carbonate it is of advantage to effect the passing in of the carbon dioxid in the presence of a small amount of ammonia under heat.

The way of carrying out the process can be explained by means of the following example:—100 kilos of fish, the intestines of which have been removed, are boiled in water for two to three hours, after this they are separated from the broth, and well washed out with hot water. The residue which, if desired, can be pressed out is ground with lime sludge (about 10 kilos of calcium oxid clagged to a thick sludge) in a mill and left standing for 48 hours while moderately stirring. By testing small test tube samples the progress of the process can be controlled, and as soon as the largest possible quantity of soluble protein has been formed the further working up can be proceeded with. After hydrolysis, the liquid is diluted with 500 liters of water and after the addition of 500 c. c. of ammonia solution (40 per cent.) carbon dioxid is passed into the liquid until the calcium carbonate has been precipitated. The mass is now quickly heated to boiling temperature in order to more easily separate the calcium carbonate and is pressed out in a filter press. The almost colorless filtrate is concentrated in a high vacuum to a syrupy consistency and this is completely freed from its water contents in a vacuum drying apparatus.

The soluble protein compound formed by the above process is of great purity free from peptone-like substances, melanins or melanoidins, is almost tasteless, forms a colorless liquid when dissolved in water, and possesses slight hygroscopic properties.

I claim—

1. A process for the manufacture of soluble protein compounds from fish in which fish which has been well boiled out and lixivated with hot water is left standing for some time at normal temperature while moderately stirring with a sludge of calcium hydrate diluted with water after hydrolizing, thereupon carbon dioxid is passed into the liquid until the calcium carbonate has been completely precipitated, if desired, with the addition of ammonia solution and application of heat, the filtrate being evaporated to dryness in the usual manner in a vacuum.

2. A soluble protein compound which is of great purity, free from peptone-like substances, melanins or melanoidins, is almost tasteless, forms a colorless liquid when dissolved in water, and possesses slight hygroscopic properties.

RUDOLF ADLER.

Witnesses:
 WOLDEMAR HAUPT,
 HENRY HASPER.